US008821064B1

(12) United States Patent
Morris et al.

(10) Patent No.: US 8,821,064 B1
(45) Date of Patent: Sep. 2, 2014

(54) ACRYLIC-MODIFIED ASPHALT REJUVENATING EMULSION

(71) Applicant: Ergon Asphalt & Emulsions, Inc., Jackson, MS (US)

(72) Inventors: Paul A. Morris, Madison, MS (US); Joel B. Shealey, Chandler, AZ (US)

(73) Assignee: Ergon Asphalt & Emulsions, Inc., Jackson, MS (US)

( * ) Notice: Subject to any disclaimer, the term of this patent is extended or adjusted under 35 U.S.C. 154(b) by 0 days.

(21) Appl. No.: 13/771,710

(22) Filed: Feb. 20, 2013

(51) Int. Cl.
*E01C 7/36* (2006.01)
*E01C 11/00* (2006.01)
*C08L 95/00* (2006.01)

(52) U.S. Cl.
CPC ............. *E01C 11/005* (2013.01); *C08L 95/005* (2013.01)
USPC ................................ 404/75; 404/17

(58) Field of Classification Search
CPC .......... C08L 95/05; E01C 11/005; E01C 7/24
USPC ........ 404/17, 72, 75, 101, 111; 77/17, 72, 75, 77/101, 111
See application file for complete search history.

(56) References Cited

U.S. PATENT DOCUMENTS

| | | | | |
|---|---|---|---|---|
| 3,261,269 A | * | 7/1966 | McGovern | 427/138 |
| 3,996,181 A | * | 12/1976 | Hayashi et al. | 524/25 |
| 4,021,393 A | * | 5/1977 | McDonald | 524/64 |
| 4,437,896 A | * | 3/1984 | Partanen | 106/223 |
| 4,661,378 A | * | 4/1987 | McGovern | 427/140 |
| 5,180,428 A | * | 1/1993 | Koleas | 106/277 |
| 5,324,136 A | * | 6/1994 | Reymonet et al. | 404/107 |
| 5,895,173 A | * | 4/1999 | O'Brien et al. | 404/108 |
| 7,104,724 B2 | * | 9/2006 | Terry | 404/110 |
| 7,357,594 B2 | | 4/2008 | Takamura | |
| 7,918,624 B2 | | 4/2011 | Blacklidge | |
| 7,963,719 B2 | * | 6/2011 | Wilson, Sr. | 404/93 |
| 8,287,945 B2 | * | 10/2012 | Takamura et al. | 427/138 |
| 2003/0187104 A1 | * | 10/2003 | Guilbault et al. | 524/59 |
| 2013/0195551 A1 | | 8/2013 | McDade et al. | |
| 2013/0195552 A1 | | 8/2013 | McDade et al. | |

OTHER PUBLICATIONS

"Polymer Modified Asphalt Emulsions—Composition, Uses, and Specifications for Surface Treatments", Publication No. FHWA-CFL/TD-12-004, Jan. 2012, U.S. Department of Transportation, Federal Highway Administration.
Road Pro NT Polymer Modified Asphalt Emulsion Brochure, Midwest industrial Supply, Inc., Jul. 6, 2005.

\* cited by examiner

*Primary Examiner* — Raymond W Addie
(74) *Attorney, Agent, or Firm* — IPLM Group, P.A.

(57) ABSTRACT

A polymer-modified emulsion used for rejuvenating or repairing deteriorated asphalt pavement includes an asphalt phase containing an asphalt and a rejuvenating agent, and an aqueous phase including water, an acrylic polymer or copolymer and an emulsifying agent.

20 Claims, No Drawings

ACRYLIC-MODIFIED ASPHALT REJUVENATING EMULSION

TECHNICAL FIELD

This invention relates to modified asphalt emulsions for road surface treatments.

BACKGROUND

Asphalt concrete, also known as asphalt pavement, is a composite material that includes mineral aggregate and an asphalt (bitumen) binder which hardens to form a robust surface. Asphalt pavement deteriorates over time from oxidation of asphalt binder, heavy loads and varying climatic conditions. One method for restoring or repairing deteriorated asphalt pavement is to remove and replace the existing pavement with either newly prepared or recycled pavement. Removal and replacement, however, is expensive and wasteful.

SUMMARY OF THE INVENTION

Rather than removing and replacing deteriorated pavement, it is preferable to restore the pavement using a surface treatment. The present invention provides, in one aspect, a polymer-modified asphalt rejuvenating emulsion comprising:

an asphalt phase comprising an asphalt and a rejuvenating agent; and an aqueous phase comprising water, an acrylic polymer or copolymer and an emulsifying agent.

In another aspect, the invention provides a method for rejuvenating deteriorated asphalt, which method comprises:

a) providing a polymer-modified asphalt emulsion comprising an asphalt phase which includes an asphalt and a rejuvenating agent, and an aqueous phase which includes water, acrylic polymer or copolymer and an emulsifying agent; and b) applying the asphalt emulsion to a deteriorated asphalt pavement surface.

Another aspect of the invention provides a rejuvenated asphalt pavement comprising a polymer-modified asphalt rejuvenating emulsion atop a deteriorated asphalt pavement, the rejuvenating emulsion containing an asphalt phase comprising an asphalt and a rejuvenating agent, and an aqueous phase comprising water, an acrylic polymer or copolymer and an emulsifying agent.

The disclosed polymer-modified asphalt rejuvenating emulsions are suitable for road maintenance of deteriorated asphalt pavement, thereby extending the life and service of the pavement.

DETAILED DESCRIPTION

The term "about" refers to a range of numbers that is considered equivalent to the recited value (e.g., having the same function or result). In many instances, the term "about" may include numbers that are rounded to the nearest significant figure.

The term "copolymer" includes, independently, copolymers, terpolymers, block copolymers, segmented copolymers, graft copolymers, and any mixture or combination thereof.

The term "deteriorated" refers to cracked, aged or oxidized asphalt pavement.

The term "emulsifying agents" refer to surfactants (including biodegradable surfactants) and to stabilizing agents. Emulsifying agents maintain the asphalt material in a stable suspension and control the emulsion breaking time, where the breaking time is the time required for the emulsified asphalt materials to separate from the aqueous phase permitting water evaporation and formation of a cured or set coating.

The term "meth" in parentheses, such as "(meth)acrylate," refers either to the acrylate or to the methacrylate, or mixtures of both. Similarly, the term (meth)acrylamide refers either to the acrylamide or to the methacrylamide, or mixtures of both.

Numerical ranges expressed using endpoints include all numbers subsumed within that range (e.g. 1 to 5 includes 1, 1.5, 2, 2.75, 3, 3.80, 4 and 5).

All percentages are weight percentages.

Disclosed are acrylic polymers or copolymers that when added to an asphalt phase that includes an asphalt and a rejuvenating agent can provide a suitable asphalt pavement surface treatment or an interlayer treatment in conjunction with other treatments. These treatments may be used as a rejuvenator, scrub seal, fog seal, sand seal, chip seal, tack coat, bond coat, crack filler or as a material for prevention of reflective cracking. The treatments enable use of a wide variety of asphalts for restoring and rejuvenating deteriorated road pavement.

The disclosed emulsion is a mixture of components that interact with one another. As a consequence, the concentration of one component may be increased within certain limits if the concentration of another is correspondingly decreased, without significantly altering the properties of the resulting composition. The disclosed emulsion may be applied to an existing base or substrate of a pavement. The disclosed emulsion includes an asphalt phase which includes asphalt and rejuvenating agents, and an aqueous phase, which includes acrylic polymers or copolymers and emulsifying agents, such that the emulsion provides a cationic, anionic, non-ionic, or neutral character to the final emulsion depending upon the desired emulsion's electrochemical properties or the intended emulsion use, for example, the surface type on which the emulsion is to be applied. The disclosed emulsion desirably includes substantial asphalt content. For example, the asphalt concentration may be about 30% to 70% of the total weight of the emulsion.

Various asphalt grades may be used in the disclosed asphalt emulsion composition depending on the expected pavement temperatures. The asphalt composition grades used in the emulsion may be defined by the Performance Grade (PG) values of the Strategic Highway Research Program (SHRP) or the American Association of State Highway and Transportation Officials (AASHTO) M320 standards. The asphalt composition grades may for example include about PG-94 (about 5-10 pen) to about PG-52 (about 160-220 pen), about PG-88 (about 10-20 pen) to about PG-64 (about 50-70 pen), or about PG-64 (about 50-70 pen) to about PG-52 (about 160-220 pen).

The asphalts used may be, for example, oxidized or air-blown asphalts, non-oxidized asphalts and blends thereof. In other aspects, the asphalt includes, but is not limited to, asphalt produced from atmospheric distillation, vacuum distillation, solvent extraction, air, or combinations of these methods. Still other asphalts may include naturally occurring asphalts such as gilsonite, asphaltites, and the like.

Asphalt blowing, also referred to as oxidation or air rectification, may be used to produce oxidized or air blown asphalt of desired consistency from a softer asphalt than the final asphalt product yielded by the blowing process. The desired result of the blowing process is an increase in softening point and a reduction in penetration values over that of the starting, base asphalt. Typically, the blowing process includes heating the base asphalt, generally to a temperature of 232.2° C. (450° F.) to 260° C. (500° F.), and blowing air into the hot asphalt for a period of time required to yield the desired properties. The blowing process is a temperature-time dependent process with an inverse relationship of temperature and time. Thus, at higher temperatures the blowing time is generally less than the time required to achieve the same properties at lower temperature. The exchange surface or contact surface between the hot asphalt and the air forced into it generally also is a factor in determining the blowing process length and the required air quantity.

Maltenes are the non-asphaltene fraction of asphalt, referred to as deasphalted or deasphaltened oil. The maltene fraction of asphalt includes polar resins, and aromatic and saturated solvents. Maltene oils may be provided by the asphalt or a rejuvenating agent. If the asphalt is low in maltenes, the deficiency may be made up by increasing the amount of rejuvenating agent used. The rejuvenating agent amount in the emulsion can be adjusted depending on the pavement surface condition where the emulsion will be applied. If the surface is deteriorated asphalt concrete, the amount of rejuvenating agent can be increased to ensure adequate dosing of the deteriorated asphalt concrete to restore the maltene fraction of the deteriorated asphalt.

Rejuvenating agents are classified into types such as RA-1, RA-5, RA-25, and RA-75 as defined by ASTM D4552. The rejuvenating agent used in the disclosed asphalt composition may resemble the maltene fraction of asphalt such as an RA-1 rejuvenating agent, a RA-5 rejuvenating agent, or mixtures thereof. Exemplary rejuvenating agents are available from Holly Frontier under their HYDROLENE™ brand asphalt oils, from American Refining Group, Inc. under their KENDEX™ brand or from Tricor Refining, LLC under their Golden Bear Preservation products RECLAMITE™ brand. Asphalt oils meeting ASTM standard D4552, and classified as RA-1 are suitable for harder asphalts, such as PG 64. RA-5, RA-25 and RA-75 oils may also be used with lower viscosity asphalts, such as PG 52.

The disclosed asphalt composition preferably employs rejuvenating agents (sometimes also called recycling agents) that are rich in aromatics and resins, with small amounts of saturates. The amount of rejuvenating agent may for example be from about 2 to about 15%, from about 2 to about 8% or from about 3% to about 6% by total weight of the emulsion. The ratio of the rejuvenating agent to the acrylic polymer or copolymer may for example be from 1:10 to 5:1, from 1:3 to 3:1, from 1:2 to 2:1, or about 1:1. The amount of rejuvenating agent may also be such that an asphalt's viscosity is restored for example to about 1,000 to about 3,000 centipoise at 60° C.

The acrylic polymer or copolymers are preferably derived from acrylate monomers. The acrylate monomers may for example be based on (meth)acrylic acid, esters of (meth) acrylic acid, (meth)acrylamide, (meth)acrylonitrile and derivatives of these acrylate monomers. Exemplary esters of (meth)acrylic acids include, but are not limited to, alkyl and hydroxyalkyl esters, e.g., methyl (meth)acrylates, ethyl (meth)acrylates, butyl (meth)acrylates, hydroxyethyl (meth) acrylate, isobornyl (meth)acrylate, and longer chain alkyl (meth)acrylates such as ethylhexyl (meth)acrylate, lauryl (meth)acrylate, cetyl (meth)acrylate, and stearyl (meth)acrylate. Derivatives of (meth)acrylamide include, but are not limited to, alkyl substituted (meth)acrylamides, e.g., N,N-dimethyl (meth)acrylamide, N,N-dipropyl (meth)acrylamide, t-butyl (meth)acrylamide, N-octyl (meth)acrylamide, and longer chain alkyl (meth)acrylamides such as N-lauryl (meth)acrylamide and N-stearyl (meth)acrylamide. The acrylic polymers also include polymers commonly known as acrylics, acrylate polymers, polyacrylates or acrylic elastomers. Acrylate polymers belong to a group of polymers which could be referred to generally as plastics while acrylic elastomer is a general term for a type of synthetic rubber whose main component is an acrylic acid alkyl ester (for example, an ethyl or butyl ester).

Exemplary copolymers include polymers derived from polyolefins such as vinyl acetate, vinyl chloride, vinylidene chloride, styrene, substituted styrene, butadiene, unsaturated polyesters, ethylene and the like. In some embodiments, the acrylic copolymer is derived from acrylate monomers and mixtures thereof and polymerized with styrene or ethylene. In still other embodiments, the acrylic copolymer is derived from butyl acrylate and copolymerized with styrene or ethylene. In yet other embodiments, the copolymer is an acrylonitrile butadiene.

Exemplary polymers or copolymers include those that assist in providing desired properties for the asphalt emulsion residue, for example by, providing a stress-absorbing layer that strongly adheres to the underlying pavement, by providing a non-tacky surface, or by providing a polymer with a non-swelling nature. The acrylic polymers or copolymers may for example be about 1 to about 15% or about 2 to about 6% by total weight of the emulsion.

Exemplary acrylic polymers or copolymers include those available from Bayer under the ACRONAL™ brand (such as ACRONAL NX 4627 and ACRONAL NX 4627x) and the BAYHYDROL™ brand. Other exemplary acrylic polymers or copolymers are available from Michelman under the LICOMER™ brand, from Wacker under the VINNAPAS™ brand, from Synothomer under the REVACRYL™ brand, from Arkema under the ENCOR™ brand, and from Westlake under the EBAC™ brand.

There are typically four categories of emulsifying agents, namely cationic, anionic, amphoteric and non ionic. Depending on the type of emulsifying agent used, an acid or a base may be needed to activate the emulsifying agent. When cationic emulsifying agents are used, acid may be added to adjust the emulsion pH to between 1.0 and 7.0. Suitable acids include inorganic acids, for example hydrochloric acid and phosphoric acid. The acid promotes a positive charge on the emulsifying agent. A subcategory of cationic emulsifying agents, known as quaternary ammonium salts, do not require acid activation because the charge is built into the emulsifying agent.

When anionic emulsifying agents are used, base may be added to adjust the emulsion pH to between 7.0 and 12.0. Suitable bases include inorganic bases, for example sodium hydroxide and potassium hydroxide. The base promotes a negative charge on the emulsifying agent.

When amphoteric emulsifying agents are used both the cationic and anionic chemical functionality are built into the same molecule. Therefore, either functionality may be activated; the cationic portion may be activated by acid or the anionic portion may be activated by base.

When nonionic emulsifying agents are used, it may not be necessary to activate the emulsifying agent with either acid or base.

The amount of emulsifying agent should preferably be sufficient to maintain a stable emulsion. The concentration can vary based on the type of emulsifying agents used and other components of the emulsion but is generally from greater than 0 to about 5% by weight of the emulsion, for example from about 0.01% to about 3.0% by weight of the emulsion.

Exemplary cationic emulsifying agents include polyamines, fatty amines, fatty amido-amines, ethoxylated amines, diamines, imidazolines, quaternary ammonium salts, and mixtures thereof. Commercial cationic emulsifying agents include, for example, those available from Akzo Nobel Surface Chemistry under the REDICOTE™ brand (including REDICOTE 4819, REDICOTE E-64R, REDICOTE E16, REDICOTE E-9, REDICOTE EM-44, REDICOTE C-346, REDICOTE E-7000 and REDICOTE E-70), and from Mead-Westvaco Corporation under the INDULIN™ brand (including INDULIN F-80, INDULIN DF-60, INDULIN DF-40, INDULIN DF-42, INDULIN DF-30, INDULIN R-20, INDULIN AA 56, INDULIN AA 57), and the AROSURF™ brand (including AROSURF AA-54, AROSURF AA-71, AROSURF AA-78, AROSURF AA-83, AROSURF AA-86 and AROSURF AA-89).

Exemplary anionic emulsifying agents include alkali metal or ammonium salts of fatty acids, alkali metal polyalkoxycarboxylates, alkali metal N-acylsarcosinates, alkali metal hydrocarbylsulphonates, for example, sodium alkylsulphonates, sodium arylsulphonates, sodium alkylarylsulphonates, sodium alkylarenesulphonates, sodium lignosulphonates, sodium dialkylsulphosuccinates and sodium alkyl sulphates, long chain carboxylic and sulphonic acids, their salts and mixtures thereof.

Exemplary amphoteric emulsifying agents include betaines and amphoteric imidazolinium derivatives.

Exemplary non-ionic emulsifying agents include ethoxylated compounds and esters, for example ethoxylated fatty alcohols, ethoxylated fatty acids, sorbitan esters, ethoxylated sorbitan esters, ethoxylated alkylphenols, ethoxylated fatty amides, glycerine fatty acid esters, alcohols, alkyl phenols, and mixtures thereof.

The emulsion may contain other additives to adjust the emulsion properties in relation to the planned use, application method, and storage conditions. These include, for example, mineral salts, thickening agents, stabilizing agents, antifreeze agents, adhesion promoters, biocides, pigments and the like.

Exemplary stabilizing agents may include polysaccharides, e.g., biodegradable glucopyranose, glycans such as β-D glucans, scleroglycans (CAS No. 39464-87-4), schizophyllan (CAS No. 9050-67-3), laminaran (CAS No. 9008-22-4), cinerean, lentinan (CAS No. 37339-90-5), curdlan (CAS No. 54724-00-4) glucose polymers, preservatives, and the like. Other stabilizing agents may include cellulose compounds or derivatives thereof, e.g. microcrystalline cellulose (AVICEL™ RC591), ethylcellulose and gunge (NATRASOL™).

Exemplary thickening agents include scleroglucan, scleroglucan modified with glyoxal or with another reactant, guar gum, gum arabic, ghatti gum, karaya gum, gum tragacanth, locust bean gum, xanthan gum, and water-soluble polyurethanes resulting in particular from the reaction of one or more polyisocyanates with one or more polyols chosen from polyester polyols and polyether polyols.

Other exemplary thickening agents are available from Latexfalt, b.v. Koudekerd a/d Rijn, The Netherlands and as described in WO 2009/113854 A1.

The weight percentage of the asphalt phase of the emulsion may for example represent from about 30% to about 70% of the total emulsion weight. The corresponding aqueous phase of the emulsion may for example represent from about 70% to about 30% of the total emulsion weight. The emulsifying agents or other additives may represent from about 0.01% to about 3.0% of the total emulsion weight, and preferably from about 0.5% to about 3.0% of the total emulsion weight.

The disclosed asphalt emulsions may be prepared by mixing, in no specific order, the emulsifying agent, acrylic polymer or copolymer and water and adjusting the pH of the resulting emulsifying agent solution depending on the emulsifying agent type. The emulsifying agent solution may for example be heated from slightly above room temperature to up to about 40° C. Separately, the asphalt and rejuvenating agent blend may for example be heated to 130 to 160° C., depending upon the viscosity of the asphalt and rejuvenating agent blend used. For example, a low viscosity asphalt such as a PG 52 might be heated to only 130° C., and a high viscosity asphalt such as a PG 64 might be heated as high as 160° C. The emulsion may be formed at ambient pressure or under pressure with subsequent cooling to below 100° C. (212° F.) before exposure to the atmosphere. The asphalt and rejuvenating agent blend and the emulsifying agent solution may be mixed or injected into a high-speed, high shear mechanical mixer, such as a colloid mill or other equipment capable of emulsifying the constituents to produce the asphalt emulsion. The temperature of the finished emulsion desirably is maintained, for example, below about 100° C. (212° F.), for example from about 71° C. (160° F.) to 99° C. (210° F.). The use of such temperatures permits operation of the mixer at ambient pressure and avoids boiling the aqueous phase and consequent interference with the emulsification process. The ratio of the asphalt and emulsifying agent solution is adjusted to produce an asphalt emulsion containing a desired amount of asphalt material, which may for example be from 30 to 70%.

In the above-described method, the acrylic polymer or copolymer may be added into the emulsifying agent solution. Alternatively, the asphalt emulsion can be produced with direct injection, where the asphalt, rejuvenating agent and emulsifying agent (without the acrylic polymer or copolymer) are injected into the colloid mill through individual supply lines and the acrylic polymer or copolymer is directly injected into the asphalt supply line just ahead of the colloid mill. The acrylic polymer-modified asphalt can also be produced by post-addition, where the desired amount of the acrylic polymer or copolymer is added into a pre-manufactured emulsion containing asphalt and rejuvenating agent but without the acrylic polymer or copolymer.

The emulsion should remain stable during storage and typically may be stored for about 14 days, depending on the constituents. Some settling may occur, but a light (simple) agitation of the emulsion usually re-disperses asphalt into the emulsion.

A final emulsion may also be prepared from a concentrate emulsion by diluting the concentrate emulsion with sufficient additional water to provide the desired asphalt or additive content in the final emulsion.

The specific weight percentages of the asphalt phase and the aqueous phase in the final emulsion may be chosen depending on factors such as the preexisting pavement composition or the base course materials and conditions, or the number of planned applications, the desired cure time, and user agency regulations or specifications. Similarly, the emulsifying agents, stabilizing agents, and other additives may be adjusted for specific application conditions, asphaltic materials, and substrates.

The final emulsion is preferably formulated such that, after application, the emulsion rejuvenates the deteriorated asphalt by restoring the aromatic content and forms a stress absorbing layer which strongly adheres to the underlying pavement.

The final emulsion may be prepared in advance of its application or at a work site immediately before its application. If desired, the concentrate may be mixed with water at a rate sufficient to produce the desired final emulsion on a continuous basis during application using metering and mixing equipment known to those skilled in the art.

The final asphalt emulsion may be applied by hand spreading, conventional spreading, spraying, or other techniques. A recommended application rate may be, for example, about 0.045 to about 2.7 liters/sq. meter (about 0.01 to about 0.60 gal/sq. yd.) or about 0.14 to about 2.0 liters/sq. meter (about 0.03 to about 0.45 gal/sq. yd.). The emulsion can be applied in multiple passes over the substrate layers at lower rates to achieve a comparable product, where the total application rate is equal to the sum of the multiple passes and is from about 0.045 liters/sq. meter to about 2.7 liters/sq. meter (about 0.01 to about 0.60 gal/sq. yd.). For example, an emulsion may be applied in three passes over the substrate layer at application rates of 0.04 liters/sq. meter (about 0.01 gal/sq. yd.) each, or a total application rate of about 0.12 liters/sq. meter (0.03 gal/sq. yd.). The emulsion application rate may also vary depending on the specified application conditions, emulsion composition, the surface to which it is applied, and the nature of the permanent materials or base (viz., the pavement structure), and other similar factors.

The emulsion temperature during application may, for example, be from about 4° C. (40° F.) to about 99° C. (210° F.), from about 49° C. (120° F.) to about 77° C. (170° F.), or from about 38° C. (100° F.) to about 71° C. (160° F.). Alternatively, the emulsion may be at ambient temperature (e.g. about 20° C. to 25° C. (68° F. to 77° F.), but if so applied may require a longer curing time. The emulsion typically is placed on top of a deteriorated surface and is allowed to cure before traffic passes over the coated surface or additional pavement layer(s) are applied to the coated surface.

The disclosed composition is further illustrated in the following non-limiting examples. Various modifications and alterations of the disclosed compositions will be apparent to those skilled in the art without departing from the scope of this disclosure.

Example 1

A polymer-modified asphalt emulsion was prepared by mixing the materials shown in Table 1. The emulsifying agent and acrylic copolymer dispersion were mixed with water and its pH adjusted to below 3 with an inorganic acid. The resulting emulsifying agent solution was heated from slightly above room temperature to about 40.° C. Separately, the asphalt and rejuvenating agent blend were heated to about 130° to 160° C. The emulsifying agent solution and heated asphalt and rejuvenating agent blend were injected into a colloid mill to produce the asphalt emulsion. The temperature of the finished emulsion was maintained below about 100° C. (212° F.). The asphalt emulsion residue was recovered by drying in a vacuum oven at 60° C. (140° F.) for three hours.

TABLE 1

| Raw Material | Wt % |
|---|---|
| Cationic emulsifying agent | 0.4 |
| Styrene-acrylate copolymer dispersion | 13.0 |
| Acid (HCl) | 2.0 |
| Asphalt | 55.90 |
| RA-1 rejuvenating agent | 9.0 |
| Water | 19.70 |
|  | 100.00 |

Example 2

The emulsions were prepared as described in Example 1, with other polymers being substituted for the styrene-acrylate copolymer dispersion. The emulsions were dried for one day under forced airflow to provide emulsion binder residues. Table 2 lists the measured complex modulus of the emulsion binder residues at 50° C. as a function of the type and amount of polymer in the emulsion. The complex modulus values were measured using a dynamic shear rheometer (DSR). The complex modulus illustrates the strength of the emulsion residue under controlled stress and strain representing a traffic condition. The chosen drying conditions illustrate the initial strength development of the asphalt emulsion binder after resumption of a traffic condition.

TABLE 2

Measured Complex Modulus of Emulsion Residue at 50° C.

| | Polymer Level in the Emulsion | | |
|---|---|---|---|
| Latex Type | 1% | 2% | 3% |
| Neoprene | 0.70 | 0.80 | 0.85 |
| SBR Latex | 0.83 | 1.1 | 1.2 |
| Acrylic Copolymer | 5.1 | 5.6 | 6.3 |

Table 2 demonstrates that the acrylic polymer-modified emulsion develops strength at lower polymer levels than the Neoprene and SBR polymer-modified asphalt emulsions.

Example 3

The strength development of polymer-modified emulsions containing 2% or 3% polymer were tested over a period of several days after application and measured using Dynamic Shear Rheometry as described in Example 2. The emulsions were prepared as in Example 2. After 1 day forced airflow drying, the emulsion residues were aged by storing in an oven at 60.° C. for 10 days and the residue complex modulus values were measured at 1 day, 3 days, 7 days and 10 days aging.

TABLE 3

Measure Complex Modules of Emulsion Residue at 50° C. Oven Aging Time at 60° C.

| | 0 day | 1 day | 3 day | 7 day | 10 day |
|---|---|---|---|---|---|
| 2% Polymer | | | | | |
| Neoprene | 0.80 | 1.1 | 1.1 | 1.2 | 1.4 |
| SBR Latex | 1.1 | 1.5 | 1.8 | 2.0 | 2.1 |
| Acrylic Polymer | 5.6 | 8.7 | 13.0 | 20.0 | 25.8 |
| 3% Polymer | | | | | |
| Neoprene | 0.85 | 1.2 | 1.6 | 1.7 | 2.2 |
| SBR Latex | 1.2 | 2 | 2.3 | 2.3 | 2.3 |
| Acrylic Copolymer | 6.3 | 10.1 | 14.2 | 23.0 | 26.9 |

Table 3 shows measured complex modulus as a function of aging. These results clearly demonstrate both the early strength development and aged strength of the acrylic-modified asphalt emulsions compared to the Neoprene and SBR polymer-modified emulsions.

I claim:

1. A polymer-modified asphalt rejuvenating emulsion comprising:

a stable liquid dispersion containing an asphalt phase comprising an asphalt and a rejuvenating agent wherein said rejuvenating agent comprises about 2% to about 15% of the total weight of the emulsion; and an aqueous phase comprising water, an acrylic polymer or copolymer and an emulsifying agent.

2. The emulsion of claim 1 wherein the asphalt phase comprises from about 30% to about 70% of the total weight of the emulsion.

3. The emulsion of claim 1 wherein the rejuvenating agent comprises maltenes.

4. The emulsion of claim 1 wherein the rejuvenating agent comprises an RA-1, RA-5, RA-25 or RA-75 rejuvenating agent.

5. The emulsion of claim 1 wherein the acrylic polymer is a butyl (meth)acrylate polymer.

6. The emulsion of claim 1 wherein the acrylic polymer is an ethyl (meth)acrylate polymer.

7. The emulsion of claim 1 wherein the acrylic copolymer is a styrene-butyl acrylate copolymer.

8. The emulsion of claim 1 wherein the acrylic copolymer is an ethylene butyl acrylate copolymer.

9. The emulsion of claim 1 wherein the acrylic polymer or copolymer is about 1% to about 15% of the total weight of the emulsion.

10. The emulsion of claim 1 wherein the emulsifying agent comprises from about 0.01% to about 3.0% of the total weight of the emulsion.

11. A method for rejuvenating deteriorated asphalt, which method comprises:
a) providing a polymer-modified asphalt emulsion wherein said rejuvenating agent comprises a stable liquid dispersion containing an asphalt phase which includes an asphalt and a rejuvenating agent comprising about 2% to about 15% of the total weight of the emulsion, and an aqueous phase which includes water, acrylic polymer or copolymer and an emulsifying agent; and
(b) applying the asphalt emulsion to a deteriorated asphalt pavement surface.

12. The method of claim 11 wherein the asphalt phase comprises from about 30% to about 70% of the total weight of the emulsion.

13. The method of claim 11 wherein the acrylic polymer is a butyl (meth)acrylate polymer.

14. The method of claim 11 wherein the acrylic polymer is an ethyl (meth)acrylate polymer.

15. The method of claim 11 wherein the acrylic copolymer is a styrene-butyl acrylate copolymer.

16. The method of claim 11 wherein the acrylic copolymer is an ethylene butyl acrylic copolymer.

17. The method of claim 11 wherein the emulsifying agent comprises from about 0.01% to about 3.0% of the total weight of the emulsion.

18. The method of claim 11 comprising applying the emulsion to the deteriorated asphalt pavement surface in an amount of about 0.045 to about 2.7 liters per square meter.

19. The method of claim 11 comprising applying the emulsion to the deteriorated asphalt pavement surface at an emulsion temperature of about 4° C. (40° F.) to about 99° C. (210° F.).

20. A rejuvenated asphalt pavement comprising polymer-modified asphalt rejuvenating emulsion atop a deteriorated asphalt pavement, the rejuvenating emulsion containing a stable liquid dispersion containing an asphalt phase comprising an asphalt and a rejuvenating agent wherein said rejuvenating agent comprises about 2% to about 15% of the total weight of the emulsion, and an aqueous phase comprising water, acrylic polymer or copolymer and an emulsifying agent.

\* \* \* \* \*